June 13, 1944. W. R. BAXTER 2,351,388
AGRICULTURAL SOIL WORKING TOOL
Filed May 19, 1941
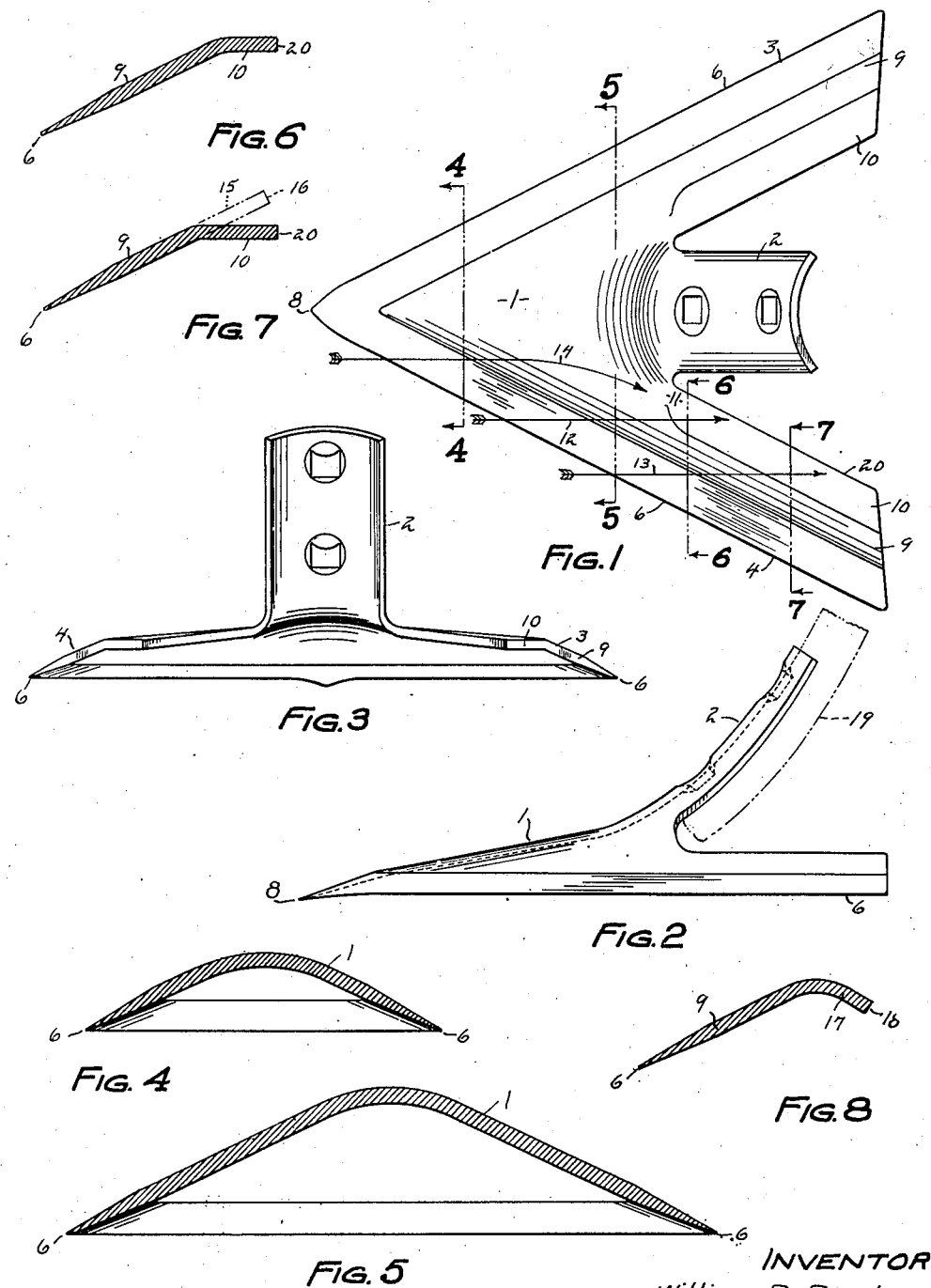
INVENTOR:
William R. Baxter
BY Harry R. Canfield
ATTORNEY.

Patented June 13, 1944

2,351,388

UNITED STATES PATENT OFFICE 2,351,388

AGRICULTURAL SOIL WORKING TOOL

William R. Baxter, Garfield Heights, Ohio, assignor to The Empire Plow Company, Cleveland, Ohio, a corporation of Ohio Application May 19, 1941, Serial No. 394,057

1 Claim. (Cl. 97—204)

This invention relates to agricultural cultivating tools of the general class that are attached to a standard or other tool support of a cultivator implement.

The invention is applicable to various types of cultivating tools, but since perhaps the most important application of the invention is to tools of the wing sweep type, it will be illustrated and described herein as applied to that type of tool.

Wing sweeps comprise generally a forwardly pointed body, a stem extending upwardly from the body for attachment to the implement, and a pair of blades or wings extending rearwardly from opposite sides of the body, or in some cases, a single blade or wing on one side only.

The body and wings are customarily provided with cutting edges extending rearwardly from the point of the body and along the outer edges of the wings, the wings and the body being shaped so that the cutting edges are in the pattern of a V, the apex of the V being at the point, and in many types of such sweeps the V-pattern edge lies substantially in a plane. In the transverse direction, the wing or blade inclines upwardly inwardly from the edge.

As mentioned above, such wing sweeps are well-known, and the present invention is directed to an improvement in the shape of the wing or wings which improvement is correlated with the recently accepted improved manner of working the soil for cultivating purposes which will now be briefly described.

Wing sweeps, besides performing the function of cutting off or uprooting weeds, also perform the function of breaking up or mulching the surface of the soil to conserve soil moisture, by reducing surface evaporation.

According to the older practice, to mulch the soil for this purpose, it was thought necessary to violently agitate and crumble the soil and turn it over. With prior sweeps, this action on the soil is performed by the transverse upward inclination of the blade. The soil as it flows rearwardly over the blade, when the sweep proceeds forwardly through the soil, rises higher and higher on the blade and finally reaches the upper edge of the inclined blade and tumbles off, turns upside down, and is, in general, violently agitated.

According to the new conception of mulching, this action on the soil leaves the surface so open that considerable evaporation of underlying moisture takes place through it; and that evaporation of moisture can be reduced further than heretofore if a layer of the surface soil be sliced or sheared off from the underlying soil and then replaced thereon with the minimum of agitation.

The obvious way to construct a sweep to accomplish this new type of mulching would be to twist the wings so that they would lie more nearly flat and at a lesser inclination to the ground plane, so that they would agitate the soil less and not turn it over.

But such an obvious change in the conventional shape of the wings or blades introduces unexpected difficulties. The forward body of the sweep must have some crown or lateral inclination with the ground plane to divide the soil and direct it to the blades on each side of the stem, otherwise it would pile up in front of the stem. If then the wings should be twisted as mentioned, the soil flowing over the blade is disturbed and unduly agitated at the twisted juncture of blade with the sweep body.

Again, a twisted blade tends to warp and lose its original shape.

Again, when the wing as in prior sweeps has considerable inclination with the ground plane, the wing blade raises the soil and breaks or shears it off at the cutting edge of the blade and relieves the cutting edge of side pressure; but if the wing be twisted for the purposes referred to and lies flatter at the cutting edge, the pressure and friction on the cutting edge would be unduly increased and would too rapidly wear away and dull the cutting edge.

This problem has been solved in the present invention by changing the shape of the blade or wing to leave the angular inclination which it makes with the ground plane, unchanged at and adjacent the cutting edge, and by bending the inner and elevated part of the blade so as to lie more nearly parallel with the ground plane; this change in shape preferably extending substantially the full length of the blade and substantially uniformly.

Twist of the blade and warpage of the blade and increased wear on the blade edge, are thus avoided, and at the same time, the action on the soil is the preferred action mentioned above of slicing off a top soil layer, and laying it down again without turning it over and with the optimum amount of agitation.

It is therefore among the objects of the present invention:

To provide generally an improved agricultural tool of the wing sweep type;

To provide generally an improved agricultural tool;

To provide an agricultural wing sweep having an improved mode of operation;

To provide an agricultural wing sweep having an improved wing construction or form of wing or blade.

Other objects will be apparent to those skilled in the art to which my invention appertains.

My invention is fully disclosed in the following description taken in connection with the accompanying drawing in which, Fig. 1 is a top plan view of a wing sweep embodying my invention;

Fig. 2 is a side elevational view of the wing sweep of Fig. 1 and illustrating in broken line a portion of an implement standard to which the sweep may be attached;

Fig. 3 is a rear elevational view of the sweep of Fig. 1;

Figs. 4 and 5 are respectively cross sectional views taken from the planes 4—4 and 5—5 of Fig. 1 and to enlarged scale;

Figs. 6 and 7 are respectively cross sectional views taken from the planes 6—6 and 7—7 of Fig. 1 and to enlarged scale;

Fig. 8 is a view similar to Fig. 7 but illustrating a modification.

Referring to the drawing, Figs. 1 to 7 inclusive, which illustrate the preferred embodiment of my invention, in a wing sweep, the sweep comprises generally a body 1, a stem 2 extending upwardly at an inclination from the rearward portion of the body, and a pair of wings 3 and 4 extending rearwardly and divergingly from the body 1 at opposite sides of the stem 2. The wing sweep illustrated is therefore a two wing sweep; but the following description may be considered as applying also to a single wing sweep, in which case the wing 3 and a portion of the body 1 may be considered as cut off along the broken line 5.

The sweep is preferably made by cutting out a flat blank from sheet metal, and forming it to the shape illustrated, by dies in a press or drop-hammer.

The rearwardly extending diverging wings 3 and 4 and the body 1 are provided with laterally opposite sharpened cutting edges 6—6 substantially in a plane, and converging into a forward point 8, and the edge is therefore generally of V-pattern.

The sweep is illustrated in the position of use in which the plane of the cutting edge 6—6 is in general parallel to the ground plane.

The body 1 is upwardly convex, or crowned, as shown in Figs. 2, 4, and 5, and splits the soil, as the sweep proceeds therethrough, directing the soil laterally over the blades 3 and 4.

The wings or blades each comprise two integral portions, a portion 9 rising from the edge 6 at an inclination with the ground plane, for a substantial distance transversely of the blade, and then continuing gradually into a portion 10 which, in the embodiment of the invention of Figs. 1 to 7, is substantially parallel with the ground plane.

This planar portion 10 of the wing extends from the rear end of the wing substantially to the body 1 where it merges gradually therewith as indicated at 11, Fig. 1.

In the operation of the sweep above-described, the tool is propelled through the soil by the implement standard indicated at 19, and substantially in the position illustrated, and at a suitable shallow depth in the soil. The cutting edge 6—6 slices or shears off a layer of the soil by the dual action of the cutting edge 6—6 and the inclination of the blade portions 9; and the soil rises upwardly along the inclined blade portions 9. The soil, in effect, flows over each blade in the direction indicated by the arrows 12 and 13 of Fig. 1 for one of the blades. When the flowing soil reaches the substantially horizontal planar portion 10 of the blade, the stream of soil gradually levels off and drops down behind the blade onto the underlying soil from which the layer or stream of soil was sheared off as described; and, because the soil at the time of leaving the planar portion 10 of the blade is flowing, in general, horizontally, it is deposited in a layer on the underlying soil without being turned over and without being thoroughly pulverized, but being broken up only to the optimum degree.

The soil raised by the crowned surface of the body 1 is split thereby and flows laterally around the stem 2 as indicated on one side of the stem by the arrow 14, Fig. 1, and flows over the planar portion 10 of the blade and is deposited on top of the said sheared off layer, likewise with the minimum of agitation.

The comparison with prior blades is indicated in Fig. 7 wherein in broken line is shown the old type of blade, the end portion 15 of which continues at the inclination of the portion 9, and terminates in an elevated edge 16. The soil in flowing over the edge 16 changes direction abruptly and falls vertically therefrom and is crumbled and turned over and, in general, violently agitated.

In considering Fig. 7, it may be borne in mind that the planar portion 10 of the wing will be only a small distance above the surface of the soil, and that while the planar portion 10 and its edge 20 appear to be only slightly lower than the inclined continuation 15 and edge 16 of the prior blade, the proportional difference is great, and the improved effect upon the soil, described above, is correspondingly great.

Beside the above-described improvement in the mulching of the soil effected by the sweep and blade above-described, there is an incidental but important advantage. By forming the planar portion 10 of the blade at an angle to the main portion 9 of the blade, the blade in cross section is generally channel form, which increases enormously its resistance to bending for a given thickness of the metal. This insures against accidental bending and deformation of the blades; and against warpage of the blades when they are formed as is the usual practice, from a hot flat blank by a drop hammer; and particularly, if they are heat-treated to harden them.

In Fig. 8 is shown a modification in which the portion 17 of the blade, instead of being planar as at 10 in the first-described form, is curved, being bent more into the direction of the soil flowing thereover to still further reduce the liability that the soil flowing over the edge 18 of the blade will be unduly broken or crumbled, this modification also providing a blade of channel cross section with the attendant advantages mentioned above.

From the foregoing description it will now be apparent that I have provided a sweep the blade of which rises at an inclination to the ground plane from a cutting edge, whereby it will shear off a layer of the soil and elevate the same and thereby relieve the cutting edge from undue lateral pressure and attendant rapid wear; and that the inner portion of the blade is disposed only a slight distance above the soil and gradually changes the direction of the flowing stream of soil into a direction more nearly parallel with the ground plane, or, as in the modification of Fig. 8, toward the ground plane, before the soil leaves the inner edge of the blade, whereby the sheared off layer of soil will be again deposited upon the surface of the ground with the minimum of agitation and pulverizing thereof; and that the blade is thereby also given a channel-section form which stiffens and strengthens it, and prevents deformation by warpage.

My invention is not limited to any particular size or proportions or type of cultivating tool, but may be embodied in many diverse forms and sizes, and my invention contemplates in its scope all such forms and sizes and all modifications of the specific structure illustrated and described hereinbefore, which come within the scope of the appended claim.

I claim:

A one piece wing sweep comprising a forwardly pointed, upwardly convexly rounded body portion, a stem extending upwardly rearwardly from the body portion for attaching the sweep to an implement, a pair of wings diverging rearwardly from the body portion on opposite sides of the stem, each wing comprising a cutting edge, the cutting edges lying substantially in a plane and converging into the forward point, each wing being planar and inclined upwardly inwardly from the cutting edge at a dihedral angle with the plane of the edges, and each planar wing at portions spaced inwardly from the cutting edge having a planar wing portion extending substantially parallel with the wing edge and disposed substantially parallel with the plane of the edges.

WILLIAM R. BAXTER.